United States Patent [19]

Keogh

[11] 4,291,136

[45] Sep. 22, 1981

[54] WATER-CURABLE SILANE MODIFIED ALKYLENE ALKYLACRYLATE COPOLYMER AND A PROCESS FOR ITS PRODUCTION

[75] Inventor: Michael J. Keogh, Bridgewater, N.J.

[73] Assignee: Union Carbide Corporation, New York, N.Y.

[21] Appl. No.: 70,785

[22] Filed: Aug. 29, 1979

Related U.S. Application Data

[63] Continuation-in-part of Ser. No. 892,153, Mar. 31, 1978, abandoned.

[51] Int. Cl.³ .................... C08F 255/02; C08L 23/26; C08L 23/32
[52] U.S. Cl. .................................. 525/102; 428/378; 428/391; 525/106; 525/245; 525/288
[58] Field of Search ............... 525/102, 106, 245, 288; 428/378, 391

[56] References Cited

U.S. PATENT DOCUMENTS

| | | | |
|---|---|---|---|
| 3,267,083 | 8/1966 | Imhof | 525/327 |
| 3,408,420 | 10/1968 | Wiggill | 525/102 |
| 3,646,155 | 2/1972 | Scott | 525/288 |
| 3,776,977 | 12/1973 | Chadha | 525/100 |
| 3,779,952 | 12/1973 | Leonard et al. | 521/64 |

OTHER PUBLICATIONS

Brochure "Tyzor" Organic Titanates by E. I. Du Pont de Nemours Co., pp. 4–10 and 11–20.

*Primary Examiner*—Wilbert J. Briggs, Sr.
*Attorney, Agent, or Firm*—James C. Arvantes

[57] ABSTRACT

A water-curable silane modified alkylene alkylacrylate copolymer and a method for its production, which method comprises reacting alkylene alkylacrylate copolymer with a particular silane in the presence of an organo titanate catalyst.

32 Claims, No Drawings

WATER-CURABLE SILANE MODIFIED ALKYLENE ALKYLACRYLATE COPOLYMER AND A PROCESS FOR ITS PRODUCTION

This is a continuation-in-part of prior U.S. application Ser. No. 892,153, filed Mar. 31, 1978, now abandoned.

BACKGROUND OF THE INVENTION

1. Field of the Invention

This invention is directed to novel olefinic copolymers containing alkylene units, alkylacrylate units and pendant hydrolyzable silane groups. Also, this invention relates to a process for preparing a water curable silane modified alkylene alkylacrylate copolymer. Additionally, this invention relates to an electrical wire or cable insulated with a water-curable silane modified alkylene alkylacrylate copolymer.

2. Description of the Prior Art

It is known to vulcanize polyolefins to extend their service temperature above the melting point of the resin. In areas such as wire and cable, continuous chemical and radiation vulcanization processes are well known. Predominant commercial processes involve a peroxide induced free radical crosslinking reaction. The process steps of coating wire and cable with a peroxide curable coating involve a continuous extrusion of the curable polyolefin composition onto the wire or cable followed by high pressure steam contact (250–300 psi pressure) to initiate peroxide decomposition and rapid vulcanization of the polyolefin composition. When a radiation curable polyolefin coating composition is used to coat a wire or cable, the same procedure is used as that for peroxide curing except that an electron beam is used as the energy source for vulcanization.

However, both the peroxide and radiation curable systems have serious shortcomings, including high capital investment and high energy utilization. Also, when peroxide curing is used, the coating tends to be difficult to carry out since it requires critical control of the process. If the process is carried too far, the polyolefin may crosslink and solidify in the process equipment (scorching). This requires time consuming delays in removing the cross-linked product from the equipment and costly losses of material.

U.S. Pat. No. 3,646,155 issued Feb. 29, 1972, describes a free radical grafting reaction of an unsaturated organosilane onto a polyolefin polymer backbone, i.e., polyethylene or copolymers of ethylene with less than 50 percent of propylene and/or butylene. The resultant thermoplastic material retains normal extrusion processability thereby permitting fabrication or shaping for end-use applications. After the grafting reaction, vulcanization is accomplished by contact with water. Elevated temperatures (80°–100° C.) and a silanol condensation catalyst are used to accelerate the vulcanization.

The reactions may be depicted as follows:

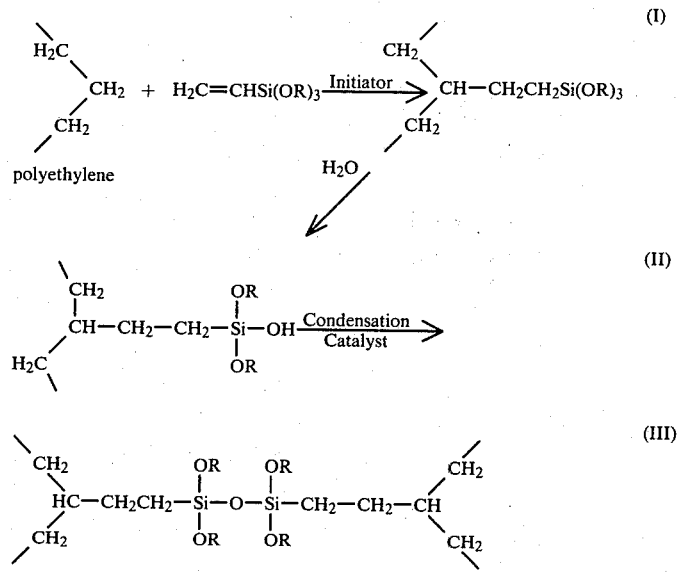

However, the peroxide initiator used in reaction (I) may be reactive toward, and can prematurely cure the polyethylene, i.e., scorch the polyethylene. This results in difficulties in processing for end use applications.

SUMMARY OF THE INVENTION

A facile process for preparing novel water-curable silane modified alkylene alkylacrylate copolymers by reacting alkylene alkylacrylate copolymers with a silane in the presence of an organo titanate catalyst, has now been developed.

An object of the present invention is to provide a process for preparing a water-curable silane modified alkylene alkylacrylate copolymer free of undesirable side reactions, such as scorching.

Another object of the present invention is to provide a process for curing a silane modified alkylene alkylacrylate copolymer.

A further object of the present invention is to provide an olefinic copolymer containing alkylene units, alkylacrylate units and pendant hydrolyzable silane groups.

A further object of the present invention is to provide insulation for electrical wire and cable based on a water-curable alkylene alkylacrylate copolymer.

A further object of the present invention is to provide a pipe extruded from a silane modified alkylene alkylacrylate copolymer.

A further object of the present invention is to provide silane modified alkylene alkylacrylate copolymers suitable for molding applications, coatings, adhesives and film.

DESCRIPTION OF THE PREFERRED EMBODIMENTS

It has now been found that a water-curable silane modified alkylene alkylacrylate copolymer can be prepared by reacting alkylene alkylacrylate copolymer with a silane in the presence of an organo titanate catalyst. The alkylene alkylacrylate copolymer thus produced can be cured with moisture/water and optionally, cured with moisture/water in the presence of a silanol condensation catalyst.

Additionally, novel olefinic copolymers containing alkylene units, alkylacrylate units and a pendant hydrolyzable silane group, as hereinafter described, are provided.

These silane modified alkylene alkylacrylate copolymers are suitable for use in films, as insulation for electrical wire and cable, as coatings and adhesives, for molding applications, and for extrusion applications, such as pipe for holding or transmitting water, particularly hot water pipe.

1. The Alkylene Alkylacrylate Copolymer

The copolymers used in the present invention comprise units corresponding to an alkylene group and an alkyl ester of an acrylic acid. By alkyl acrylic ester, for the purpose of this invention, is meant an alkyl ester of an acrylic acid, as defined in Acrylic Resins, by Milton B. Horn, p. 15f., under the subtitle "Monomer Chemistry," whereunder alkyl esters of both unsubstituted acrylic acid $(CH_2=CH-COOH)$ and simple alpha substituted acrylic acids such as those acrylic acids having a lower alkyl substituent, e.g., methacrylic acid $(CH_2=C-COOH)$
$\phantom{(CH_2=}|$
$\phantom{(CH_2=}CH_3$ are included. Specific acrylic esters suitable for formulation of the copolymers include such as the methyl, ethyl, propyl, isopropyl, butyl, isobutyl, t-butyl, hexyl, 2-ethylhexyl, decyl, lauryl, and stearyl esters of acrylic or methacrylic acids. It will be obvious to those skilled in the art that the alkyl portion of the alkyl acrylate may also have, if desired, certain simple substituents which do not substantially interfere with the formation of the copolymers nor detract from their desirable properties, without departure from the scope and spirit of this invention. Presently, the preferred alkyl esters are the lower alkyl esters of simple acrylic acids, for example, methyl, ethyl and butyl acrylates and methacrylates.

The alkylene group of the alkylene alkylacrylate copolymer contains 2 to 18 carbon atoms, and preferably 2 to 3 carbon atoms.

The preferred copolymer is ethylene ethylacrylate copolymer containing from about 1 to about 50 percent by weight ethylacrylate. The most preferred copolymer is ethylene ethylacrylate copolymer containing from 2 to about 20 percent by weight ethylacrylate.

The alkylene alkylacrylate copolymers generally have a density (ASTM 1505 test procedure with conditioning as in ASTM D-148-72) of about 0.92 to 0.94 and a melt index (ASTM D-1238 at 44 psi. tested pressure) of about 0.5 to 500 decigrams per minute.

2. The Silanes

The silanes used to form the water-curable silane modified alkylene alkylacrylate copolymer are characterized by the following formula:

$X\text{---}(CH_{2a})\text{---}SiY_3$ wherein X is SH, NH$_2$ or $$R-\overset{\overset{\displaystyle O}{\|}}{C}-O-,$$

wherein R therein is $$CH_2=\underset{\underset{\displaystyle R_1}{|}}{C}-$$

or C$_1$ to C$_{18}$ alkyl; R$_1$ is independently hydrogen or C$_1$ to C$_{18}$ alkyl; a is an integer of 1 to 18; Y is independently hydrogen, a hydrocarbon radical of 1 to 18 carbon atoms, C$_1$ to C$_{18}$ alkoxy, or $-O\text{---}(CH_2)_a\text{---}O\text{---}(CH_2)_a H$ with the proviso that at least one of Y is other than hydrogen or hydrocarbon.

The preferred silanes are of the formula:

$X\text{---}(CH_2)_a Si(OR_2)_3$ wherein X and a are as previously defined, and R$_2$ is C$_1$ to C$_8$ alkyl.

The most preferred silanes include:

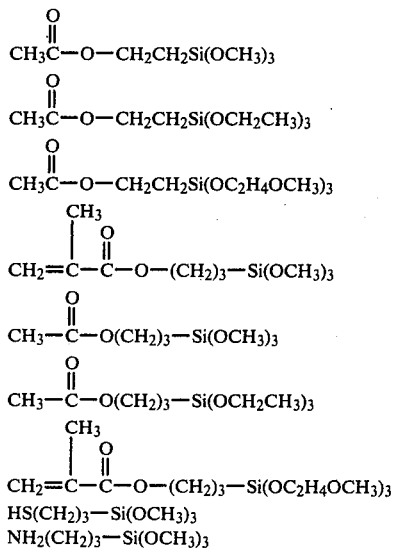

3. The Organo Titanate Catalyst

The organo titanate catalysts of the present invention are characterized by the following structural formula:

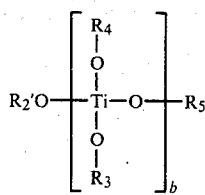

wherein $R'_2$, $R_3$, $R_4$ and $R_5$ are independently selected from hydrogen, alkyl, cycloalkyl, aryl, alkaryl, aralkyl of 1 to 20 carbon atoms, lactyl and acyl of the formula:

(wherein $R_6$ is alkyl of 1 to 20 carbon atoms); and b is an integer from 1 to 100. These organo titanates are commercially available materials and are prepared according to the procedures as set forth in U.S. Pat. No. 2,984,641, which patent is incorporated herein by reference.

The preferred organo titanate catalyst is of the formula:

wherein $R_7$ is independently $C_1$ to $C_{20}$ alkyl, preferably $C_1$ to $C_8$ alkyl.

The most preferred organo titanates are tetrabutyl titanate and tetraisopropyl titanate.

Also, the organo titanate catalyst herein include chelates. These chelates are described in U.S. Pat. No. 2,984,641 and are commercially available. The chelates include tetraoctylene glycol titanium, triethanolamine titanate, titanium acetyl acetonate, and titanium lactate.

These titanates may also be used with co-catalysts which are well known in the art as co-catalysts for esterification reactions. These co-catalysts include transition metal carboxylate salts.

These organo titanates are used in a catalytic amount. A preferred amount of organo titanate is from about 0.10 to about 2.0 weight percent, based on the weight of resin.

4. Reaction to Prepare Silane Modified Alkylene Alkylacrylate Copolymers

The reaction of alkylene alkylacrylate copolymer and organo silane compound may be carried out at a temperature of between about 25° C. and up to the volatility temperature of the silane. This temperature is preferably between about 140° and 225° C. and most preferably, between about 155° and 225° C. However, temperatures higher than the volatility temperature of the silane may be used with increased pressure.

The reaction may be carried out at atmospheric pressure however, higher pressures may be used.

The reaction may be carried out employing any suitable apparatus. However, the reaction is preferably carried out under conditions in which the copolymer is subjected to mechanical working. The reaction is preferably carried out in Brabender or Banbury mixers, for example.

The copolymer and silane reactants may be brought together by any convenient means. For example, the organo silane may be added to the fluxed copolymer after which the organo titanate catalyst is added or alternatively, the copolymer containing the organo titanate catalyst is reacted with the silane or the organo titanate and silane are first mixed and then added to the fluxed copolymer.

The reaction is preferably carried out in the absence of solvent although organic solvent may be employed if desired to facilitate the addition of, for example, the organo silane to the reaction.

The reaction of the copolymer and silane may be depicted (with ethylene ethylacrylate copolymer) as follows:

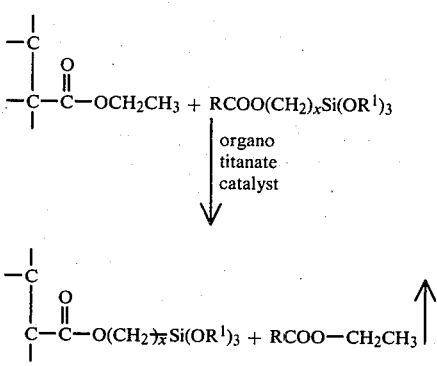

The cross-linking of the silane modified alkylene alkylacrylate copolymer is effected by exposing it to moisture. The moisture present in the atmosphere is usually sufficient to permit cross-linking to occur. However, the rate of cross-linking may be hastened by use of an artificially moistened atmosphere, immersion in water and optionally employing elevated temperatures. Cross-linking may be effected at temperatures of between about 25° and 100° C. and preferably, 70° C. to 100° C. Also, the silane modified alkylene alkylacrylate copolymer can be exposed to steam at temperatures of 100° C. or higher.

The cross-linking reaction may be depicted as follows:

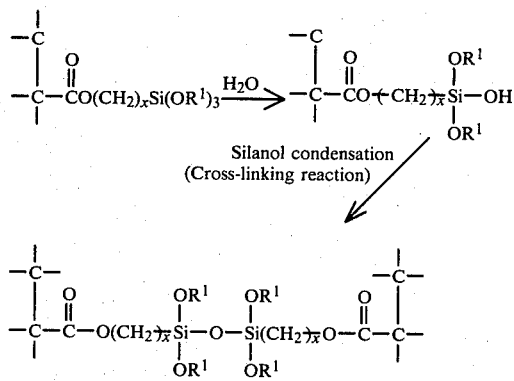

Additionally, the cross-linking may be carried out in the presence of a silanol condensation catalyst. A unique feature of this invention is that the cross-linking reaction can be carried out at significant rates in the absence of added silanol condensation catalyst. The organo titanate catalyst or catalyst residues used in the ester-interchange reaction, supra, also catalyze the cross-linking reaction. The prior art reactions of organo silanes with polyolefins using peroxides or radiation, require catalyst added in a separate step to accomplish significant cross-linking rates.

Alternatively, a wide variety of materials which function as silanol condensation catalysts and which are known in the art may be employed in the process of this invention. Such materials include, for example, metal carboxylates such as dibutyltin dilaurate, stannous acetate, stannous octoate, lead napthenate, zinc octoate, iron-2-ethylhexoate and cobalt napthenate; organic bases such as ethylamine, hexylamine, dibutylamine and piperidine and acids such as mineral acids and fatty acids.

5. The Silane Modified Alkylene Alkylacrylate Copolymer

The novel silane modified alkylene alkylacrylate copolymers of the present invention contain polymerized alpha olefin units having the formula:

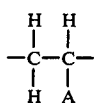    I.

wherein A is hydrogen or an alkyl radical of 1 to 16 carbon atoms, said alpha olefin units being present in said copolymer to the extent of at least 50 wt. percent; at least 0.1 wt. percent polymerized units containing the radical of the formula:

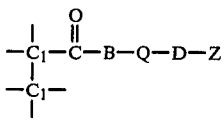    II.

wherein $C_1$ is a carbon atom in the main polymer chain; B is a radical selected from —O—,

—S—; Q is a divalent radical having 1 to 18 carbon atoms, bonded through carbon atoms to B and D; preferably Q is a radical of the formula —(CH$_2$)$_{\overline{a}}$ wherein a is an integer of 1 to 18; D is a silicon containing radical of the formula:

wherein V is selected from hydrogen, hydrocarbon radicals of 1 to 18 carbon atoms, and a hydrolyzable group; Z is a hydrolyzable group; and polymerized units having the formula:

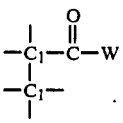    III.

wherein $C_1$ is a carbon atom in the main polymer chain and W is an alkoxy radical of 1 to 18 carbon atoms. Preferably B is —O—, Q is selected from the group consisting of —CH$_2$—CH$_2$—, and —CH$_2$—CH$_2$—CH$_2$—; Z and V are independently selected from the group consisting of methoxy and ethoxy, and W is selected from the group consisting of methoxy, ethoxy and butoxy.

6. Adjuvants

Adjuvants such as fillers including carbon black, clay, talc, magnesium silicate, calcium carbonate, silicas, aluminum hydroxide, calcium silicate, etc. may be used with the silane modified alkylene alkylacrylate copolymers in amounts sufficient to produce the intended effect.

The copolymer may be rendered flame retardant by use of known halogen-containing flame retardant additives in admixture with an organic or inorganic antimony compound, e.g. antimony oxide.

Additionally it is believed that compositions containing the present copolymer, halogen-containing flame retardant and at least one of CaO, CaCO$_3$, Ca(OH)$_2$, CaSO$_4$, MgO, MgCO$_3$, Mg(OH)$_2$, and MgSO$_4$ would have advantageous properties. The halogen-containing flame retardants include decabromodiphenyl oxide, chlorinated polyethylene, polyvinyl chloride, and halogenated parafin waxes.

7. Examples

The following examples are merely illustrative of the present invention and are not intended as a limitation on the scope thereof.

EXAMPLES 1 to 10

A Brabender mixer was heated to 160° C. and maintained under a blanket of argon and charged with ethylene-ethylacrylate copolymer having a melt index of 4.5 and an ethylacrylate content of 18 percent. The resin was fluxed and an amount of silane, as shown in Table I, was added, and the contents mixed until homogeneity was obtained. Tetraisopropyl titanate catalyst (1.0 weight percent) was slowly added. The contents were heated at 155°–160° C. for about 15 minutes.

After preparation, the copolymer was blended with 5 weight percent of a 1 weight percent dibutyltin dilaurate resin masterbatch and pressed into plaques and suspended in water for 3 hours at 90° C.

(The masterbatch was prepared as follows: a quantity of ethylene vinylacetate copolymer (10 wt. percent vinylacetate 2.0 melt index) was treated with a 25 percent by weight solution of dibutyltin dilaurate in isopropyl alcohol in an amount to produce a 1 weight percent dibutyltin dilaurate resin masterbatch. The solvent was removed in a vacuum oven heated at 40° C. for about 12 hours. The material so produced was stored under argon until use).

The plaques were removed from the water, wiped dry and placed in a vacuum oven at 50° C. for 1 hour to remove residual water.

The plaques were then measured for cure according to the Monsanto Rheometer cure test. This test procedure is fully set forth in U.S. Pat. No. 4,018,852 issued Apr. 19, 1977, which patent is incorporated herein by reference. Briefly, FIG. 1 of said patent shows the typical Monsanto Rheometer curve. The cure level (highest cross-link density) is designated as H. It is measured in terms of inch-pounds of torque on the rheometer test equipment. A higher value for H corresponds to a higher crosslink density.

Also, the plaques were measured for decalin extractables according to Referee Method A of ASTM D-2765. The decalin soluble portion of the polyethylene compound is a quantitative measure of its degree of cure. The larger the weight percent value, the lower the degree of cure.

The results are set forth in Table I.

TABLE I

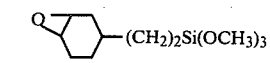

| Example | Silane | Amt. of Silane[1] (wt.percent) | Rheometer Torque-Level (H) (in-lbs.) | Decalin Extractables(wt.%) |
|---|---|---|---|---|
| 1 | $CH_2=C(CH_3)COO(CH_2)_3Si(OCH_3)_3$ | 4.4 | 41 | 25.4 |
| 2 | $CH_3COO(CH_2)_3Si(OCH_3)_3$ | 4.0 | 45 | 23.1 |
| 3 | $CH_3COO(CH_2)_2Si(OCH_2CH_3)_3$ | 3.7 | 51 | 20.1 |
| 4 | $CH_3COO(CH_2)_3Si(OCH_3)_3$ | 4.7 | 30 | 29.8 |
| 5 | $CH_3OOC(CH_2)_3Si(OCH_3)_3$ | 3.5 | 3 | 99.9 |
| 6 | $HS(CH_2)_3Si(OCH_3)_3$ | 3.0 | 14 | 44.8 |
| 7 | (epoxycyclohexyl)$-(CH_2)_2Si(OCH_3)_3$ | 3.0 | 4 | 99.6[2] |
| 8 | $NH_2(CH_2)_3Si(OC_2H_5)_3$ | 3.0 | 11 | 43.6[2] |
| 9 | $C_2H_3Si(CH_3COO)_3$ | 3.0 | 3 | No cross-linking[2] |
| 10 | $CH_3CONH(CH_2)_3Si(OCH_3)_3$ | 3.0 | 3 | No cross-linking[2] |

[1]Weight adjusted to mol equivalents
[2]Reaction attempted up to 190° C. for 15 minutes.

EXAMPLES 11 TO 16

The procedure of Examples 1 to 10 was repeated except that 40 grams of ethylene ethylacrylate copolymer, having a melt index of 2.4 and an ethylacrylate content of 14 percent was used. Also, tetraisopropyl titanate catalyst and methacryloxypropyltrimethoxy silane (in amounts as shown in Table II) were added.

After preparation, the silane modified ethylene ethylacrylate copolymer was pressed into plaques and cured according to the procedure as set forth in Examples 1 to 10. The plaques were measured for cure by the procedure as described in Examples 1 to 10. The results are as set forth in Table II.

The data in Table II shows the effect of silane concentration on the degree of cure. Increasing the silane charged to the system results in a higher degree of crosslinking.

TABLE II
Effect of Silane Content on Cure Level

| Example | Amt. of Silane (wt. %) | Amt. of Catalyst (wt. %) | Rheometer Torque (H) (in-lbs.) |
|---|---|---|---|
| 11 | 2.5 | — | 4.6 |
| 12 | 2.0 | 0.5 | 19.2 |
| 13 | 2.5 | 0.5 | 32.8 |
| 14 | 3.0 | 0.5 | 36.2 |
| 15 | 4.0 | 0.5 | 38.0 |
| 16 | 5.0 | 0.5 | 45.0 |

EXAMPLES 17 TO 23

The procedure of Examples 11 to 16 was exactly repeated except that 2.5 wt. percent of methacryloxypropyltrimethoxy silane and tetraisopropyl titanate catalyst, in the amounts as shown in Table III, were added. Also, the copolymers so produced were pressed into plaques and cured by the procedure as described in Examples 11 to 16.

The decalin extractables and the cure were measured according to the procedure as described in Examples 1 to 10. The results are set forth in Table III.

The data in Table III shows the effect of the catalyst concentration on the reaction. It was found that lower cure values were obtained at higher titanate catalyst concentration.

TABLE III
Effect of Catalyst Concentration on Cure Level

| Example | Catalyst (wt. %) | Rheometer Torque (in-lbs.) | Decalin Extractable (wt. %) |
|---|---|---|---|
| 17 | 0 | 4.6 | 99.5 |
| 18 | 0.20 | 29.0 | — |
| 19 | 0.35 | 27.0 | — |
| 20 | 0.5 | 32.8 | 29.3 |
| 21 | 1.0 | 27.8 | 35.7 |
| 22 | 1.5 | 21.7 | 38.9 |
| 23 | 2.0 | 20.3 | 38.9 |

EXAMPLES 24 TO 28

The procedure of Examples 11 to 16 was exactly repeated except that 40 grams of the type of copolymer, containing the percent of ethylacrylate therein as set forth in Table IV was used. Also, 1.0 weight percent of tetraisopropyl titanate catalyst and 2.5 wt. percent of methacryloxypropyltrimethoxy silane were used in the reaction. The copolymer so produced was pressed into plaques and cured by the procedure as described in Examples 1 to 10.

The cure and decalin extractables were measured according to the procedure as described in Examples 1 to 10.

The type of copolymer, percent ethylacrylate content, decalin extractables and cure are set forth in Table IV.

The data in Table IV shows that various copolymers are suitable as the base resin in the process of the present invention.

TABLE IV

| Example | Copolymer | % Ethyl-Acrylate | Rheometer Torque (H) (in-lbs.) | Decalin Extractables (wt. %) |
|---|---|---|---|---|
| 24 | Ethylene ethylacrylate | 18 | 34 | 28.4 |
| 25 | Ethylene ethylacrylate | 14 | 29 | 31.8 |
| 26 | Ethylene | 10.5 | 29 | 35.1 |

TABLE IV-continued

| Example | Copolymer | % Ethyl-Acrylate | Rheometer Torque (H) (in-lbs.) | Decalin Extractables (wt. %) |
|---|---|---|---|---|
| 27 | Ethylene ethylacrylate | 2 | 15.8 | 38.8 |
| 28 | Ethylene ethylacrylate butylacrylate | 10[1] | 26 | 34.0 |

[1] indicates % of butylacrylate

EXAMPLE 29

The procedure of Examples 11 to 16 was repeated using 1.0 weight percent tetraisopropyl titanate catalyst and 2.5 weight percent of methacryloxypropyltrimethoxy silane. The reactants were heated for 10 minutes at between 155°–160° C. The reaction was found to be complete in about 10 minutes. Prolonged heating at this temperature did not lower the grafting level of the silane onto the copolymer nor did it lead to scorching if moisture was excluded from the reaction.

EXAMPLES 30 TO 36

The procedure of Examples 11 to 16 was repeated except that 1.0 percent of tetraisopropyl titanate and 2.5 weight percent methacryloxypropyltrimethoxy silane were used.

The silane modified ethylene ethylacrylate copolymer produced was pressed into plaques and cured according to the procedure as set forth in Examples 1 to 10, for the time (hours) as set forth in Table V.

The cure and decalin extractables were measured according to the procedure as described in Examples 1 to 10. The results are set forth in Table V.

The data in Table V show that the samples are fully cured in a time period of one hour, and longer heating is unnecessary.

TABLE V

| Example | Cure Time Hours | Rheometer Torque (H) (in-lbs.) | Decalin Extractables (wt. %) |
|---|---|---|---|
| 30 | 1 | 25.4 | 39.0 |
| 31 | 2 | 26.0 | 40.1 |
| 32 | 3 | 28.0 | 38.2 |
| 33 | 4 | 26.0 | 38.7 |
| 34 | 5 | 29.2 | 38.6 |

TABLE V-continued

| Example | Cure Time Hours | Rheometer Torque (H) (in-lbs.) | Decalin Extractables (wt. %) |
|---|---|---|---|
| 35 | 6 | 30.2 | 38.1 |
| 36 | 8 | 30.4 | 37.6 |

EXAMPLES 37 TO 44

The procedure of Examples 11 to 16 was repeated except that the ethylene ethylacrylate copolymer had a melt index of 4.5 and an ethylacrylate content of 18%. Also, 2.5 weight percent of silane, as described in Table VI, and 1 weight percent of tetraisopropyl titanate were used.

After preparation, the copolymer (Examples 37 to 40) was pressed into plaques and cured for 1 and 3 hours, respectively using masterbatch catalyst as described in Examples 1 to 10. The plaques were measured for cure by the procedure as described in Examples 1 to 10.

After preparation of the copolymer of Examples 41 to 44, the copolymer was pressed into plaques without adding catalyst masterbatch, by heating at 90° C. for 1 and 3 hours. The cure was measured according to the procedure as described in Examples 1 to 10.

The data of Table VI show that high levels of crosslinking are obtained in the absence of added silanol condensation catalyst.

TABLE VI

| | | WITH MASTERBATCH Rheometer Torque (in - lbs.) | | WITHOUT MASTERBATCH Rheometer Torque (in - lbs.) | |
|---|---|---|---|---|---|
| Example | Silane | 1 hour | 3 hours | 1 hour | 3 hours |
| 37 | $CH_3COO(CH_2)_3 Si(OC_2H_5)_3$ | 19 | 22 | — | — |
| 38 | $CH_3COO(CH_2)_2 Si(OCH_3)_3$ | 44 | 48 | — | — |
| 39 | $CH_3COO(CH_2)_3 Si(OCH_3)_3$ | 29 | 37 | — | — |
| 40 | $CH_2=C(CH_3) COO(CH_2)_3 Si(OCH_3)_3$ | 22 | 32 | — | — |
| 41 | $CH_3COO(CH_2)_3 Si(PCH_2H_5)_3$ | — | — | 10 | 15 |
| 42 | $CH_3COO(CH_2)_2 Si(OCH_3)_3$ | — | — | 40 | 44 |
| 43 | $CH_3COO(CH_2)_3 Si(OCH_3)_3$ | — | — | 18 | 23 |
| 44 | $CH_2=C(CH_3) COO(CH_2)_3 Si(OCH_3)_3$ | — | — | 18 | 22.5 |

EXAMPLES 45–46

The procedure of Examples 11 to 16 was repeated except that 40 grams of ethylene ethylacrylate copolymer having a melt index of 4.5 and an ethylacrylate content of 18 percent was used. Also, the amount and type of silane, as described in Table VII, was added. Tetraisopropyl titanate (1.0 weight percent), was used as the catalyst.

After preparation the silane modified ethylene ethylacrylate copolymer was pressed into plaques and cured for 1 and 3 hours, respectively, according to the procedure as set forth in Examples 1 to 10. The cure and decalin extractables were measured according to the procedure as set forth in Examples 1 to 10.

The data shows that the triethoxy containing silane exhibits a lower degree of cure than the trimethoxy containing silane under the same conditions.

TABLE VII

Silane Alkoxy Group Effect on Cure Speed

| | Silane | | Rheometer Torque (H) (in - lbs.) | | Decalin Extractables (wt. %) | |
|---|---|---|---|---|---|---|
| Example | Type | Amt. (wt. %) | 1 hr. cure | 3 hr. cure | 1 hr. cure | 3 hr. cure |
| 45 | $CH_3COO(CH_2)_3 Si(OCH_2CH_3)_3$ | 3.5 | 19 | 22 | 40 | 37.5 |
| 46 | $CH_3COO(CH_2)_3$ | 3.0 | 29 | 37 | 31.5 | 25 |

EXAMPLES 47 TO 49

The procedure of Examples 11 to 16 was repeated except that 40 grams of ethylene ethylacrylate copolymer having a melt index and percent of ethylacrylate as set forth in Table VIII was used. Also, 2.5 weight percent of $CH_3COO(CH_2)_2Si(OCH_3)_3$ silane 1 weight percent of tetraisopropyl titanate was used.

After preparation, the silane modified ethylacrylate copolymer was pressed into plaques and cured according to the procedure as set forth in Examples 1 to 10. The cure and decalin extractables were measured according to the procedure as set forth in Examples 1 to 10. Also, the following tests were performed on the cured silane modified ethylene ethylacrylate copolymer; tensile strength and elongation, D-638-72, tensile strength and elongation after heat aging for 1 week in an oven set at 121° C.; secant modulus, ASTM-D882-758; dielectric constant and dissipation factor (60 cycles), ASTM-D150-74; deformation at 121° and 175° C., ASTM D-621. The results are set forth in Table VIII.

Also, the silane modified copolymer was extruded onto a No. 14 American Wire Gauge copper wire to give a coating 30 mils thick and then immersed in water to cure the coating. The tensile strength and elongation ASTM 412-68, and the tensile strength and elongation after heat aging for one week in an oven set at 121° C. were measured. The results are set forth in Table VIII.

TABLE VIII

| Example | 47 | 48 | 49 |
|---|---|---|---|
| Ethyl acrylate content (%) | 10.5 | 2.0 | 10.5 |
| Melt Index | 2.4 | 2.1 | 2.4 |
| Tensile strength (psi) | 1500 (1890)[2] | 1470 | 1770(1530)[2] |
| Elongation (%) | 240 (375)[2] | 280 | 180(150)[2] |
| Tensile strength after heat aging (psi) | 1090 (1380)[2] | 1125 | 1660 |
| Elongation after heat aging (%) | 280 (280)[2] | 220 | 160 |
| Modulus (psi) | 9,140 | 16,900 | 24,200 |
| D.C. (60 cycle) | 2.672 | 2.433 (2.388)[3] | 2.881 |
| D.F. (60 cycle) | 0.00196 | 0.00142 (0.0005)[3] | 0.0124 |
| Rheometer torque (H) (in - lbs.) | 19 | 11 | 15 |
| Decalin extractables (wt. %) | 27.4 | 47.6 | 27.2 |
| Deformation (%) | | | |
| @ 121° C. | 40.7 | 61.4 | 44.5 |
| @ 175° C. | 39.3 | 63.7 | 44.5 |

[1]Contains 75 weight percent ethylene ethylacrylate copolymer, 24.5 weight percent talc and 0.5 wt. percent Agerite MA heat stabilizer.
[2]Measured on wire.
[3]Values measured on base resin as control.

What is claimed is:

1. A process for preparing a water-curable silane modified alkylene alkylacrylate copolymer which comprises reacting an alkylene alkylacrylate copolymer with a silane characterized by the following formula:

$$X\text{-}(CH_2)_a SiY_3$$

wherein
X is SH, NH$_2$ or

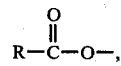

wherein R therein is

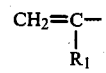

or $C_1$ to $C_{18}$ alkyl; $R_1$ is independently hydrogen or $C_1$ to $C_{18}$ alkyl; a is an integer of 1 to 18; Y is independently hydrogen, a hydrocarbon radical of 1 to 18 carbon atoms, $C_1$ to $C_{18}$ alkoxy or $-O-(CH_2)_aO-(CH_2)_aH$, with the proviso that at least one of Y is other than hydrogen or hydrocarbon, said reaction being carried out at a temperature between about 25° C. and the volatility temperature of the silane, in the presence of a catalytic amount of organo titanate catalyst.

2. A process as in claim 1 wherein the alkylene portion of the alkylacrylate copolymer contains 2 to 3 carbon atoms.

3. A process as in claim 2 wherein the alkylene alkylacrylate copolymer is ethylene ethylacrylate copolymer.

4. A process as in claim 2 wherein the alkylene alkylacrylate copolymer is ethylene butylacrylate copolymer.

5. A process as in claim 1 wherein the silane is of the following formula:

$$X\text{-}(CH_2)_a Si(OR_2)_3$$

wherein X is SH, NH$_2$ or

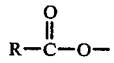

wherein R therein is

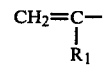

or $C_1$ to $C_{18}$ alkyl; $R_1$ is independently hydrogen or $C_1$ to $C_{18}$ alkyl; a is an integer of 1 to 18; $R_2$ is $C_1$ to $C_8$ alkyl.

6. A process as in claim 1 wherein Y is $-O-(CH_2)_aO-(CH_2)_aH$ wherein a is 1 to 18.

7. A process as in claim 1 wherein the temperature is between about 140° and 225° C.

8. A process as in claim 7 wherein the temperature is between 155° and 225° C.

9. A process as in claim 1 carried out at atmospheric pressure.

10. A process as in claim 1 carried out at a pressure of from atmospheric to 150 psi.

11. A process as in claim 1 wherein the organo titanate catalyst is of the formula:

$$Ti(OR_7)_4$$

wherein $R_7$ is independently $C_1$ to $C_{20}$ alkyl.

12. A process as in claim 11 wherein $R_7$ is independently $C_1$ to $C_8$ alkyl.

13. A process as in claim 12 wherein the organo titanate catalyst is tetraisopropyl titanate.

14. A process as in claim 12 wherein the organo titanate catalyst is tetrabutyl titanate.

15. A process wherein the water-curable silane modified alkylene alkylacrylate copolymer produced as in claim 1 is exposed to moisture.

16. A process wherein the water-curable silane modified alkylene alkylacrylate copolymer produced as in claim 1 is exposed to steam.

17. A process as in claim 15 wherein the copolymer is exposed to moisture in the presence of an added silanol condensation catalyst.

18. A silane modified alkylene alkylacrylate copolymer comprising: alpha olefin units having the formula:

   I.

wherein A is hydrogen or an alkyl radical of 1 to 16 carbon atoms, said alpha olefin units being present in said copolymer to the extent of at least 50 wt. percent; at least 0.1 wt. percent polymerized units containing the radical of the formula:

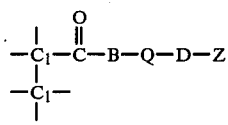   II.

wherein $C_1$ is a carbon atom in the main polymer chain; B is a radical selected from —O— and —S—; Q is a radical of the formula $-(CH_2)_a-$ wherein a is an integer of 1 to 18, D is a silicon containing radical of the formula:

wherein V is selected from hydrogen and hydrocarbon radicals of 1 to 18 carbonatoms, and a hydrolyzable group; Z is a hydrolyzable group; and polymerized units having the formula:

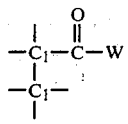   III.

wherein $C_1$ is a carbon atom in the main polymer chain and W is an alkoxy radical of 1 to 18 carbon atoms.

19. An electrical wire or cable insulated with a composition comprising the copolymer of claim 18.

20. A pipe extruded from a composition comprising the copolymer of claim 18.

21. The silane modified copolymer of claim 18 wherein B is —O—.

22. The copolymer of claim 21 wherein Q is selected from the group consisting of —CH$_2$—CH$_2$—, and —CH$_2$—CH$_2$—CH$_2$—; Z and V are selected from the group consisting of methoxy and ethoxy, and W is selected from the group consisting of methoxy, ethoxy and butoxy.

23. An electric wire or cable insulated with a composition comprising the copolymer of claims 21 or 22.

24. A pipe extruded from a composition comprising the copolymer of claims 21 or 22.

25. A process as in claim 5 wherein X is

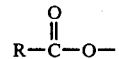

and R therein is as previously defined.

26. A silane modified copolymer of ethylene-ethyl acrylate as defined in claim 18 wherein the silane is derived from acetooxyethyltrimethoxy silane.

27. A silane modified copolymer of ethylene-ethyl acrylate as defined in claim 18 wherein the silane is derived from acetooxyethyltriethoxy silane.

28. A silane modified copolymer of ethylene-ethyl acrylate as defined in claim 18 wherein the silane is derived from methacryloxypropyltrimethoxy silane.

29. A silane modified copolymer of ethylene-ethyl acrylate as defined in claim 18 wherein the silane is derived from methacryloxypropyltris-(2-methoxyethoxy) silane.

30. A silane modified copolymer of ethylene-ethyl acrylate as defined in claim 18 wherein the silane is derived from acetooxypropyltrimethoxy silane.

31. A silane modified copolymer of ethylene-ethyl acrylate as defined in claim 18 wherein the silane is derived from acetooxypropyltriethoxy silane.

32. The cured product of the silane modified alkylene-alkyacrylate copolymer defined in claim 18.

* * * * *

UNITED STATES PATENT AND TRADEMARK OFFICE
CERTIFICATE OF CORRECTION

PATENT NO. : 4,291,136
DATED : September 22, 1981
INVENTOR(S) : Michael J. Keogh It is certified that error appears in the above-identified patent and that said Letters Patent are hereby corrected as shown below:

Column 4, line 10; "X$(CH_{2a})$ $SiY_3$" should read --X$(CH_2)_a$ $SiY_3$--.

Column 8, line 19; insert the word --preferably-- before "in admixture".

Column 11, Example 38; "$CH_3COO(CH_2)_2Si(OCH_{33}$" should read --$CH_3COO(CH_2)_2Si(OCH_3)_3$--.

Column 11, Example 41; "$CH_3COO(CH_2)_3Si(PCH_2H_5)_3$" should read --$CH_3COO(CH_2)_3Si(OC_2H_5)_3$--.

Column 11, Example 46; "$CH_3COO(CH_2)_3$" should read --$CH_3COO(CH_2)_3\ Si(OCH_3)_3$--.

Signed and Sealed this

Fifteenth Day of December 1981

[SEAL]

Attest:

GERALD J. MOSSINGHOFF

Attesting Officer   Commissioner of Patents and Trademarks